Jan. 16, 1962    D. G. KELEMEN    3,017,251
PROCESS FOR THE PRODUCTION OF SILICON
Filed Aug. 19, 1958

INVENTOR
DENIS G. KELEMEN
BY Francis J. Crowley.
ATTORNEY

3,017,251
PROCESS FOR THE PRODUCTION OF SILICON
Denis G. Kelemen, Wilmington, Del., assignor to E. I. du Pont de Nemours and Company, Wilmington, Del., a corporation of Delaware
Filed Aug. 19, 1958, Ser. No. 755,901
4 Claims. (Cl. 23—223.5)

This invention relates to an improved process for the preparation of silicon by the deposition of silicon on a resistance-heated silicon filament.

The process of depositing silicon on a hot filament, which is known as a hot wire process, has been described by Holbling in Z. angew. Chem., 40,655 (1927), by Litton and Anderson, in J. Electrochem. Soc., 101,287 (1954), and elsewhere. Decomposition of such componds as $SiCl_4$, $SiI_4$, and the like on tantalum and on carbon filaments is shown in this literature. A disadvantage inherent in the use of such filaments is that the material of the filament diffuses into the silicon product, thus resulting in contamination of the silicon. Sangster et al. in J. Electro-Chem. Soc., 104,317 (1957), discloses the deposition of silicon on a silicon filament. Although the use of a silicon filament in a conventional hot wire process eliminates a major source of contamination, it is by no means a complete solution to the problem. Contamination can still be caused by the electrical contacts which supply current to the filament. During operation, these contacts become heated and the material of the contacts finds its way into the silicon product by such means as diffusion into the hot filament, or by the formation of volatile impurities which pass into the end product. Such volatile materials may be minute amounts of the contact material itself or a volatile product formed by a reaction between the contacts and the chemicals used to produce the silicon.

It is among the objects of this invention to overcome the foregoing disadvantages of producing silicon by the hot wire process. A further object is an improvement method of producing filaments for use in a hot wire deposition process.

The objects of this invention are accomplished by an improvement in the process for the production of silicon by the decomposition of a vaporized silicon compound having the formula $$SiH_{(4-n)}Xn$$

wherein $n$ is 0–4, and
X is a halogen selected from the group consisting of chlorine, bromine and iodine.

This process is conducted in a decomposition zone containing an electrical-resistance-heated silicon filament maintained above the decomposition temperature of the silicon compound, but below the melting point of silicon (e.g., 800° C.–1400° C.) so that solid silicon is deposited on the filament. Silicon compounds which may be decomposed in this process include the silanes, the halosilanes, and silicon tetrachloride, silicon tetraiodide, and silicon tetrabromide. When silicon tetrachloride is a starting material hydrogen is used as a reducing agent since silicon tetrachloride will not thermally decompose appreciably at temperatures below the melting point of silicon. The improvement of this invention comprises contacting the vapor of the silicon compound with an electrical-resistance-heated silicon filament having a deposition segment of relatively small cross section disposed between and integral with two end sections of larger cross section. The deposition section of the filament is maintained at least at the decomposition temperature of the silicon compound so that silicon will deposit thereon. On the other hand, the end sections can be maintained below the decomposition temperature of the silicon compound by reason of less electrical resistance in these portions of the filament due to their larger cross sections. This procedure maintains the ends of the filament and the electrical contacts supplying current to the filament at a sufficiently low temperature to prevent contamination of the silicon end product by the material of the contacts. The decomposition process is discontinued before the end sections become sufficiently heated to cause substantial depositions of silicon thereon. The silicon filament which is recovered from the decomposition zone may be used as a semiconductor material or the deposition section may be removed from the two end sections and these two end sections may be used to produce a new filament by butting the two end sections together in a vertical position and in alignment along their longitudinal axis. Heat is then applied to produce a narrow molten zone at the junction. One of the ends is then withdrawn from the molten zone at a rate that draws a filament section of the diameter desired for silicon deposition.

Figure 1:
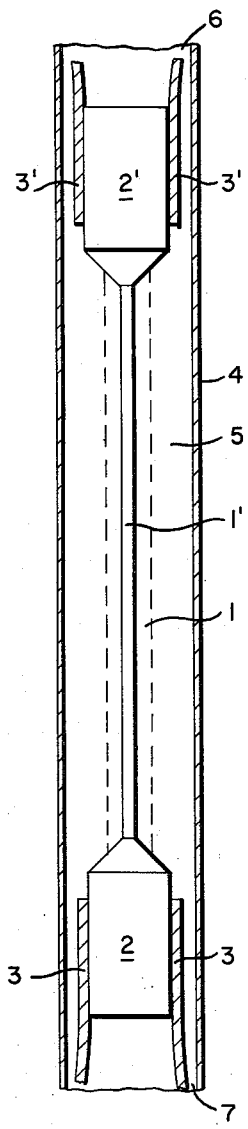
FIG. 1 is a diagrammatic representation of a cylindrical silicon deposition filament having enlarged terminal ends and positioned within a section of a tubular sheath of the reactor by tapered chucks.

A specific application of the invention can be described in conjunction with FIG. 1. A silicon rod or filament 1 (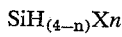 inch in diameter and 20 inches long) disposed between enlarged ends 2 and 2' (three inches in length and one inch in diameter) is placed in a reactor 4, preferably made of silica. The filament is conected to electrical chucks 3 and 3' made of tantalum, or other high-melting electrical conductor, and the deposition section 1 of the rod is heated by electrical resistance to 1300° C. while there is substantially no resistance-heating of the enlarged ends. A reactant gas mixture such as 60:1 mol ratio mixture of pure hydrogen and silicon tetrachloride is passed into the decomposition zone 5 through the annular opening 6 and silicon is deposited on the deposition section forming the larger rod 1'. The reaction by-product gases are removed through annular opening 7. The reaction is continued until the original deposition section 1 is increased to a diameter of ⅞ inch. The silicon bar thus produced is removed from the reactor, and separated from the enlarged terminal ends, which can be reused in another filament. The product bar of silicon is high purity material. If desired, it may be floating zone refined in the same apparatus, before removal therefrom.

For a clearer understanding of the invention, the following specific examples are given. These examples are intended to be merely illustrative of the invention and not in limitation thereof.

Example I

A tantalum tube ⅛" in diameter and 9 inches long is installed in a hot wire deposition apparatus comprised of a 2-inch diameter silica tube in a vertical position. The silica sheath is provided with gas inlet and exit tubes at each end and with electrical conduits extending through the silica wall and connected to electrically conducting chucks which support the tantalum tube concentrically with the silica tube. A mixture of silicon tetrachloride and hydrogen is passed into the silica tube and over the tantalum tube which is raised to 1250° C. by electrical resistance-heating. Silicon deposits on the tantalum tube and deposition is continued until the over-all diameter of the tube and deposited silicon reaches ¾ of an inch. The rod thus produced is cut into two pieces, one 3 inches long, and the other 4 inches long. These pieces have the portion of the tantalum tube which was in the chuck extending out of one end. By partially immersing these two pieces of silicon vertically in aqua regia, with the exposed length of tantalum extending upwardly out of the acid, the immersed tantalum is dissolved, leaving the protruding portions of the tantalum tube to serve as electrical connections.

Figure 2:
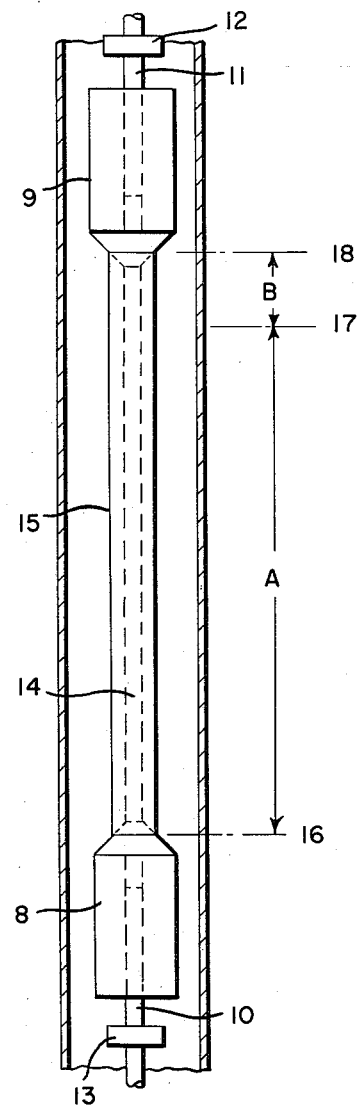
FIG. 2 is a diagrammatic representation of a deposition filament after silicon has been deposited thereon. This filament is positioned within a section of the tubular sheath of the reactor by imbedded tantalum tubes held in jaw chucks.

Referring now to FIG. 2, it will be seen that the two pieces of silicon 8 and 9 with extending tantalum rods 10 and 11 are then placed in the independently movable chucks 12 and 13 of a modified floating zone refining apparatus adapted for deposition of silicon. The chucks are provided with electrical contact leads, not shown. The modified floating zone refining apparatus is also equipped with a gas inlet and outlet. It is also surrounded by a movable concentric induction coil energized by a 5 kw. 4 megacycle oscillator (not shown). The longer silicon rod is placed in the bottom chuck and the short rod is placed in the upper chuck. Argon gas is introduced to purge and provide protection from atmospheric contamination. The rods are brought together and preheated with an electrically-heated tantalum ring placed around their adjoining ends. When the silicon becomes sufficiently hot to be further heated by the induction coil, the tantalum ring is removed, and a molten zone is created at the junction of the two pieces of silicon by means of the induction coil. The induction coil is then moved downward at the rate of one inch per hour while the upper chuck is moved upward at the rate of eight inches per hour. In two hours the operation is finished, and deposition section 14 is formed between the two end pieces 8 and 9. This deposition section is 18 inches long and 0.17 inch in diameter. The flow of argon is continued, and section 14 is raised to 1300° C. by passing electrical current through it, by means of the low-resistance electrical chucks 12 and 13, while the enlarged end sections 8 and 9 remain at about 800° C.

A mixture of hydrogen and silicon tetrachloride (mol ratio 60:1) is then introduced into the bottom of the modified zone refining apparatus, and contacted with the resistance deposition section 14. Due to the high temperature of this section, a vapor phase decomposition takes place and silicon is deposited uniformly on the section to form the enlarged rod 15. The reaction by-products are removed from the reactor in the form of vapor through an outlet tube provided at the top of the apparatus. The reaction is continued for 15 hours until the rod 15 is about ½" in diameter. There is no deposition of silicon on the larger diameter ends 8 and 9, since their temperature remains below reaction temperature.

After the deposition is completed, the heating current is discontinued and the reactant gas mixture is swept out of the apparatus and replaced by argon. The rod 15 is then zone refined by causing a molten zone generated by the high frequency heating coil to traverse the rod from bottom to top at the rate of $\frac{1}{16}$ inch per minute. The rod is removed from the zone refining apparatus and cut at points 16, 17 and 18, as shown in FIG. 2. The ¾-inch long section B of rod between points 17 and 18 is the section where the zone refining was stopped and it contains the segregated impurities. The section A between points 16 and 17 is high quality silicon suitable for diodes, transistors, rectifiers, and other electronic devices. The ends containing the tantalum contacts are recovered for reuse.

*Example II*

The ends of the silicon rod containing the tantalum contacts are replaced in the modified zone refining apparatus. A single crystal of pure silicon ¾ of an inch in diameter and 3 inches long is welded on to the lower chuck. The processes described in Example I for forming a deposition section, depositing of silicon on this section, and zone refining the product, are repeated.

The final product silicon from these procedures is a single crystal of P-type silicon having a resistivity (which is substantially the same all along the rod) of 740 ohm-centimeters, and a lifetime of 870 microseconds. The ends which still contain a portion of the single crystal seed are available for reuse after the silicon product in the deposition section is removed.

*Example III*

A silicon deposition filament with enlarged ends is formed by welding under an atmosphere of inert gas. The ends of this filament are cylindrical crystals and they were prepared by the Czochralski procedure of drawing crystals. These crystals are about 2 inches in diameter and about 3 inches in length. The deposition section of the filament is 30 inches long and ¼ inch in diameter. The filament is installed in between the electrode clamps of a modified floating zone refining apparatus which is the same as that of Example I, except that the silica sheath is 3 inches in diameter and the heating wire and power source are larger. A flow of argon is maintained in the apparatus and an electric current is passed through the rod to heat the small diameter section to 900° C. The ends of the filament remain below 300° C. $SiH_4$ gas is then passed through the apparatus, and silicon is deposited on the deposition section of the filament until the diameter of that section is increased to 1½ inches. The flow of reactant gas is then stopped; and after cooling in an inert atmosphere, the rod is removed and the narrow product section is recovered by cropping the ends. Another thin filament is then welded between the terminal ends, and the deposition process repeated.

*Example IV*

The process described in Example III is repeated using trichlorosilane as the reactant gas. The terminal ends of the silicon filament are below 600° C. while the deposition portion of the filament is maintained at about 1000° C. The silicon product recovered is useful in semiconductor devices.

The drawing of a deposition filament suitable for use in the process of this invention can be accomplished in conventional equipment. The ends of the filament should be made large enough so that a reasonable amount of silicon can be deposited on the deposition section before the heating current raises the temperature of the end sections to a point at which silicon is deposited on these sections. For example, if the reaction is the hydrogen reduction of silicon tetrachloride, the ends are maintained at a temperature substantially below 800° C., while the deposition section is being maintained at a temperature within the range of 800° C. to 1400° C., and preferably at about 1250° C. If the vapor phase reaction is the decomposition of $SiHCl_3$ with hydrogen, the terminal ends are maintained at a temperature substantially below 700° C. and the deposition section is maintained at a temperature within the range of 700° C.–1400° C., and preferably at about 1100° C. If the vapor phase reaction is the thermal decomposition of silane, the terminal ends are maintained substantially below 300° C., and the deposition section is maintained at a temperature within the range of 600° C. to 1400° C., and preferably within the range of 900° C.–1100° C. When $SiBr_4$ or $SiI_4$ or the halosilanes are used, it may be preferred to carry out the invention by using hydrogen as a reducing agent.

The welding, disjoining and other forming steps of the silicon filament and the larger diameter ends are best done in a closed apparatus in the presence of an inert gas. Also the production of heat for the welding and disjoining is best accomplished by some form of induction heating which is preceded by a preheating step which decreases the resistance of the silicon sufficiently to allow induction heating to take place. For example, a ring of a high-melting elemental material, such as tantalum, can be electrically heated and it in turn will preheat the silicon. Since such arrangements are found in the usual floating zone refining apparatus, a modified form of this apparatus is suitable for any preheating which has to be done. The principal modifications necessary are the provision of gas inlet and exit conduits, and the provision of independently movable electrical connections suitable for heavy duty resistance heating.

The dimensions of the deposition section and the ends of the filament are subject to wide variations. The length of filament deposition section can be varied from a very few inches to 5–10 feet or more depending on the initial diameter of the filament section. The length of the end sections need be only long enough to make the necessary connections thereto.

The type of electrical conduit connection may be varied. While a tantalum tube within the silicon terminal end is a convenient means, other types of terminal connectors such as clamping collars and the like may be used, if desired.

Disjoining or separating parts of the silicon filament can be done by removing the filament from the apparatus and cutting with a diamond point saw at the desired place. However, it is inevitable that some contamination is introduced if it is handled in this way. A much more advantageous method can be accomplished in the floating zone refining apparatus. Induction heating is used to produce a narrow molten zone in the rod at the point of separation and then the upper end is raised quickly out of the melt, thus causing separation at the desired point. The drawing of the filament is also easily conducted in the floating zone refining apparatus by withdrawing the upper section of the rod from the molten zone at a faster lineal rate than is used to move the molten zone downward.

A particular advantage obtained by using the same apparatus for the steps of forming the filament, depositing the silicon and zone refining is that handling of the silicon is completely eliminated and introduction of impurities from extraneous sources is minimized. A further advantage is the more favorable economics, since all steps can be carried out sequentially within the one apparatus. Another advantage of the sequential operation within the same apparatus is attained when enough of the high-purity-zone-refined bar is allowed to remain at the lower terminal for use in drawing another filament for a succeeding deposition cycle.

Since it is obvious that many changes and modifications can be made in the above-described details without departing from the nature and spirit of the invention, it is to be understood that the invention is not to be limited to said details except as set forth in the appended claims.

I claim:

1. In a process for the production of silicon by the decomposition of a vaporized silicon compound having the formula $$SiH_{(4-n)}X_n$$

wherein $n$ is 0–4, and $X$ is a halogen selected from the group consisting of chlorine, bromine and iodine, said process being conducted in a decomposition zone maintained below the melting point of silicon and containing an electrical-resistance-heated silicon filament, and when the silicon compound being decomposed is $SiCl_4$, hydrogen is an essential element within said decomposition zone, the improvement which comprises contacting the vapor of said silicon compound with an electrical-resistance-heated silicon filament having a deposition segment of relatively small cross section disposed between and integral with two end sections of larger cross section, said deposition section being maintained at least at the decomposition temperature of said silicon compound while said end sections are below said decomposition temperature by reason of a lesser electrical resistance in their larger cross sections, depositing silicon on said deposition section by decomposition of the silicon compound, and discontinuing the decomposition reaction before the end sections become sufficiently heated to cause substantial depositions of silicon thereon, and recovering silicon end product.

2. The process of claim 1 in which the silicon compound is silicon tetrachloride.

3. The process of claim 1 in which the silicon compound is silane.

4. The process of claim 1 in which the silicon compound is trichlorosilane.

References Cited in the file of this patent

UNITED STATES PATENTS

| | | |
|---|---|---|
| 1,180,968 | Brockbank | Apr. 25, 1916 |
| 2,402,839 | Ohl | June 25, 1946 |
| 2,469,418 | Striplin et al. | May 10, 1949 |
| 2,804,377 | Olson | Aug. 27, 1957 |
| 2,854,318 | Rummel | Sept. 30, 1958 |
| 2,907,642 | Rummel | Oct. 6, 1959 |
| 2,927,004 | Girardot | Mar. 1, 1960 |